United States Patent [19]

Foss

[11] Patent Number: 5,536,418

[45] Date of Patent: Jul. 16, 1996

[54] METHOD FOR PROCESSING MULTIPLE, SMALL BATCHES OF WASTE MATERIAL

[76] Inventor: Milton K. Foss, 81 W. Vancouver Dr., Port Townsend, Wash. 98368

[21] Appl. No.: 434,450

[22] Filed: May 3, 1995

[51] Int. Cl.[6] .................................................... C02F 1/72
[52] U.S. Cl. .......................... 210/758; 210/800; 210/805; 210/201; 210/703; 210/704; 210/241; 210/532.2
[58] Field of Search ..................................... 210/601, 609, 210/758, 767, 800, 241, 252, 258, 532.2, 703, 704, 201, 805

[56] References Cited

U.S. PATENT DOCUMENTS

| | | | |
|---|---|---|---|
| 3,013,665 | 12/1961 | Schmidt et al. | 210/241 |
| 3,262,571 | 7/1966 | Petretti | 210/241 |
| 3,317,049 | 5/1967 | Petretti | 210/241 |
| 4,260,488 | 4/1981 | Condolios | 210/259 |
| 4,389,314 | 6/1983 | Petretti | 210/241 |
| 4,525,277 | 6/1985 | Poulin | 210/241 |
| 4,536,286 | 8/1985 | Nugent | 210/202 |
| 4,543,183 | 9/1985 | Petretti | 210/241 |
| 4,769,154 | 9/1988 | Saylor et al. | 210/707 |
| 4,818,392 | 4/1989 | Werner et al. | 210/195.3 |
| 4,927,543 | 5/1990 | Bablon et al. | 210/711 |
| 5,312,551 | 5/1994 | Perron et al. | 210/241 |
| 5,380,427 | 1/1995 | Foss | 210/95 |

OTHER PUBLICATIONS

Hawley's Condensed Chemical Dictionary, 1987, p. 863.

*Primary Examiner*—Robert J. Popovics
*Attorney, Agent, or Firm*—Craine & Jackson

[57] ABSTRACT

An improved method for processing multiple small batches of waste material from different collection sites is provided. The method uses an apparatus designed to process small batches of waste material from a collection site, such as a septic tank, into waste water and sludge material. Using the apparatus, the waste material first undergoes oxidation with an oxidizing agent and separation with a flocculating agent. After the oxidizing and separating steps are completed, the waste water is then drained from the apparatus and returned to the collection site. The sludge material produced is then transported to a second collection site. The waste material from the second collection site is then added and mixed with the sludge material produced from the first small batch of waste material. The new waste material is then oxidized and separated into waste water and sludge material. The waste water is then drained from the apparatus and deposited into the collection site. This process of collecting and processing multiple small batches of waste material is repeated until the maximum capacity of the apparatus or hauling truck is reached. At that time, the collected sludge material is then transported and deposited at a suitable waste water treatment facility.

1 Claim, 2 Drawing Sheets

METHOD FOR PROCESSING MULTIPLE, SMALL BATCHES OF WASTE MATERIAL

BACKGROUND OF THE INVENTION

1. Field of the Invention

This invention relates to methods used to process waste material and, more particularly, to such methods designed to process waste material recovered from multiple collection sites.

2. Description of the Related Art

Liquid waste hauling companies often process small batches of waste material from multiple collection sites, such as septic tanks or portable restrooms each workday. A convenient and economical apparatus and system for processing small batches of waste material is disclosed by the inventor in U.S. Pat. No. 5,380,427. The apparatus includes a processing tank in which a small batch of waste material, between 750 and 2,000 gallons, is first oxidized and then separated into waste water and sludge material. The waste water is then deposited back into the septic tank. The sludge material is deposited on site and used as fertilizer or transported and deposited at a private or public waste water treatment facility.

The sludge material is transported by the liquid waste hauling companies to the waste water treatment facilities in hauling trucks with large vacuum tanks capable of holding approximately 2,000 gallons of waste material. Most private and public waste water treatment facilities charge a fixed fee based on the maximum capacity of the truck's vacuum tank. No credit or reduction of the fee is given to hauling companies when their vacuum tanks are partially filled. It is therefore more economical for hauling companies to completely fill their vacuum tanks with sludge material before delivery to the waste water treatment facility.

An important drawback, however, is collecting and processing the necessary volume of waste material to produce sufficient amount of sludge material to fill the hauling truck's vacuum tank. One possible way to overcome this drawback is to process multiple, small batches of waste material and then collect the sludge material produced from each small batch. When a sufficient amount of sludge material has been produced—i.e., amount equal to the capacity of the hauler's vacuum tank—it could then be transported to the waste water treatment facility.

SUMMARY OF THE INVENTION

It is an object of the invention to provide an improved method of processing multiple, small batches of waste material.

It is another object of the invention to provide such a method in which the sludge material produced after each small batch is collected together for deposit at the waste water treatment facility in a cost efficient manner.

These and other objects are met by providing an improved method of processing small batches of waste material, defined as less than 2,000 gallons, from multiple waste material collection sites, such as septic tanks or portable restrooms. The method includes selecting an apparatus capable of first oxidizing a small batch of waste material and then separating it into waste water and sludge material. The waste water can be drained off and the sludge material can be collected. In the preferred method, the apparatus disclosed in U.S. Pat. No. 5,380,427 is used, which comprises a processing tank constructed on a trailer or truck bed for easy transport. Attached to the bottom of the tank is a hopper section with a discharge pipe attached at one end. A mixer is placed inside the processing tank which is used to mix the waste material and the oxidizing and flocculating agents together. Viewing ports are constructed on the sides of the processing tank which are used by the operator to view the chemical and physical processes taking place therein during treatment.

After selecting the apparatus, the apparatus is transported to a collection site. A vacuum truck accompanies the apparatus which is used to remove the waste material from the collection site and place it into the truck's vacuum tank. When deposited into the vacuum tank, the waste material is then pumped into one or both processing tanks for processing located on the apparatus.

Once deposited into the processing tank, oxidizing and flocculating agents are then added and mixed with the waste material. When the oxidation process is completed, the waste material is allowed to separate into two layers—an upper layer of sludge material and a lower layer of waste water. After separating, the waste water is then removed from the processing tank and deposited back into the collection site.

The sludge material, which is a slurry, may be stored inside the apparatus' processing tank or transferred back into the vacuum truck's vacuum tank. The apparatus and vacuum truck are then transported to a second collection site. The new waste material from the second collection site is transferred into one or both processing tanks or the vacuum truck's vacuum tank and mixed with the old sludge material. It is then oxidized and flocculated in the same manner as described above.

The collecting and processing of waste material from multiple collection sites continues until the total volume of sludge material either prevents new waste material from being processed, or the amount of sludge material exceeds the capacity of the apparatus or the vacuum tank, or when it is economical to deposit it at the waste water treatment facility.

DESCRIPTION OF THE PREFERRED EMBODIMENT(S)

Figure 1:
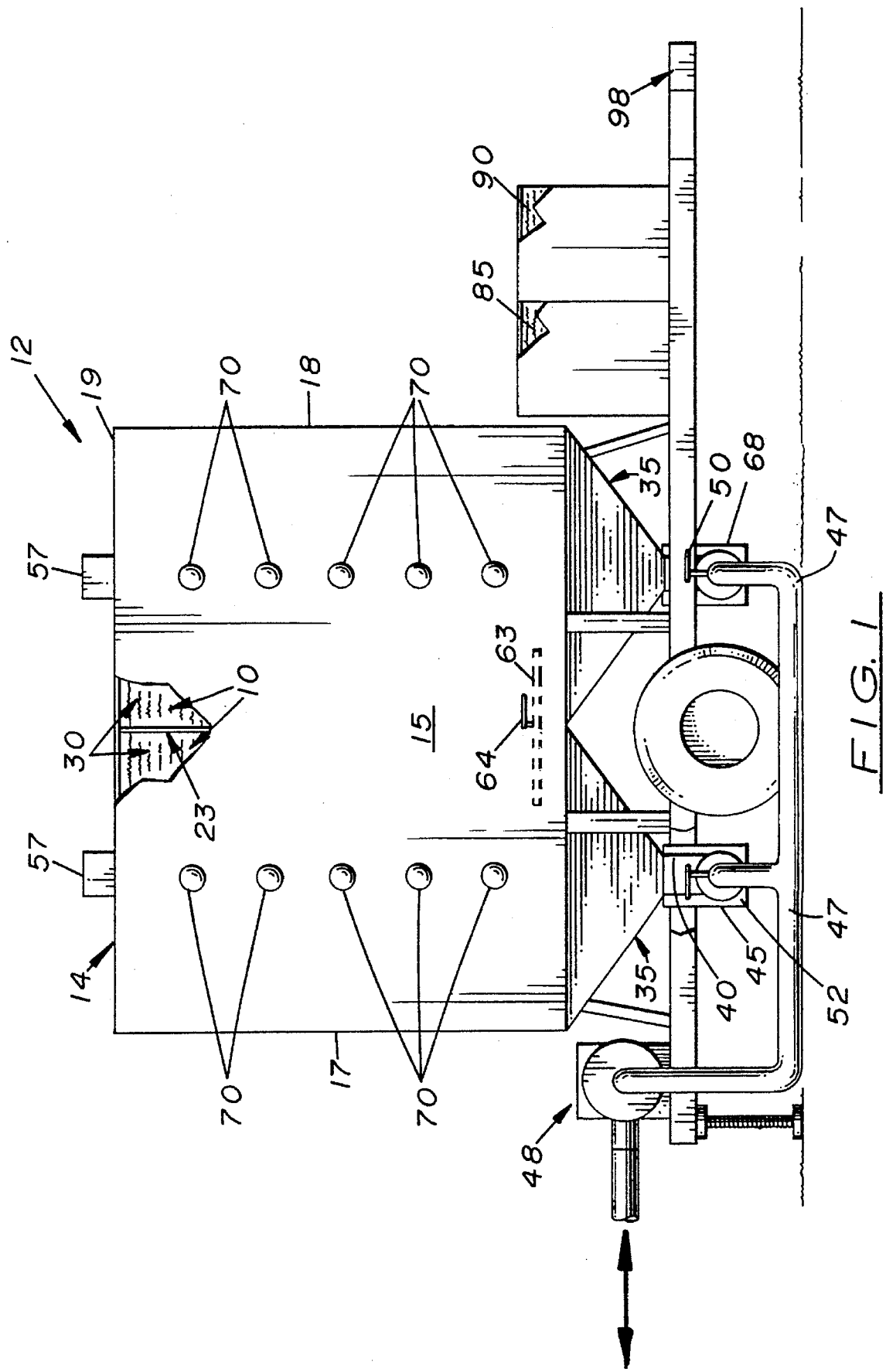
FIG. 1 is a front elevation view of the apparatus attached to a trailer.
Figure 2:
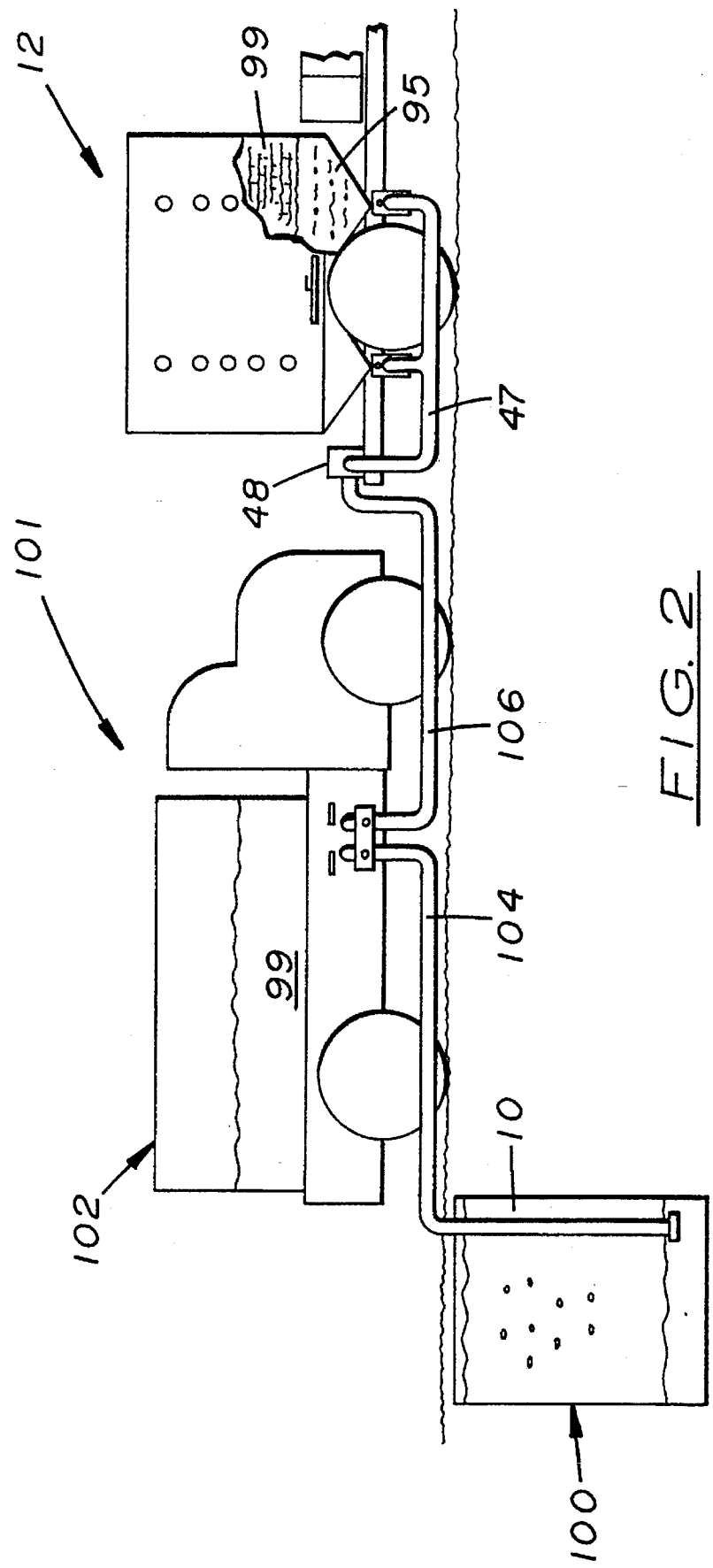
FIG. 2 is a diagram showing the apparatus and vacuum truck assembled near a septic tank collection site.

As described herein and shown in the accompanying FIGS. 1–2, there is disclosed an improved method for processing multiple small batches of waste material. The method uses an apparatus and system capable of processing small batches of waste material as shown in U.S. Pat. No. 5,380,427 and which is herein incorporated by reference.

The apparatus 12, shown assembled on a trailer 98 in FIG. 1, is designed to provide a safe, economical and easy method for processing waste material from collection sites having relatively small volumes of waste material, such as septic tanks or portable restrooms. In the preferred embodiment, the apparatus 12 comprises a single receptacle 14 divided by a transversing, vertically disposed partition 23 into two, equal size, processing tanks 30. The receptacle 14 is designed to hold up to approximately 2,000 gallons of waste material 10, with each processing tank 30 designed to hold up to approximately 1,000 gallons. The upper portion of the receptacle 14 is square or rectangular in cross section with a vertical front side 15, a vertical back side (not shown), a vertical left side 17, a vertical right side 18 and a horizontal top surface 19.

The lower portion of each processing tank 30 has a v-shaped hopper section 35. The lower surfaces of each hopper section 35 are sloped downward and converge toward the vertical center line of the processing tank 30 and terminate to form a rectangular-shaped discharge opening. A hollow, rectangular-shaped discharge neck section 40 is attached to the descending edges of the lower surfaces of the hopper section 35 to create a continuous pathway into a 3-inch diameter discharge pipe 45 welded to the lower portion of the discharge neck section 40. Attached to the end of the discharge pipe 45 is an inlet-outlet hose 47. A two-way valve, hereinafter called a lower valve 50, is attached to the inlet-outlet pipe 47 which enables the operator to selectively control the direction of flow of waste material 10 into and out of the processing tanks 30. The inlet-outlet pipe 47 may be attached to an auxiliary pump 48 to facilitate deposit and/or removal of the waste material 10. A connecting pipe 63 with a two-way manual valve, hereinafter known as an upper valve 64, is disposed inside the receptacle between the lower sections of the two processing tanks 30 to enable the operator to selectively control the distribution of waste material 10 between the two processing tanks 30 during the filling process.

An auger is disposed inside the discharge pipe 45 which is used to forcibly remove hardened or thick sludge material therefrom. The auger is attached at one end to a 1 hp. hydraulic or electric motor 68 located on the back surface of the discharge pipe 45.

Each processing tank 30 has a mixer (not shown) attached to the mixer motor 57, which comprises an elongated shaft and two four-blade propellers. The upper end of the mixer's shaft extends through the top surface 19 and connects to the armature of the mixer motor 57 while the opposite lower end extends vertically and centrally into the processing tank 30 towards the hopper section 35.

On the section of the vertical front surface 15 adjacent to each processing tank 30 are five viewing ports 70. The viewing ports 70 are designed and positioned on the front surface 15 to enable the operator to determine the amount of waste material 10 pumped inside each processing tank 30. The viewing ports 70 also enable the operator to visually monitor the chemical and physical processes taking place inside each processing tank 30 during treatment. Each viewing port 70 is circular in shape and are made of durable plastic or glass material. The viewing ports 70 are vertically aligned and centrally located along the section of front surface 15 adjacent to each processing tank 30. During operation, the operator can view the level of the waste material inside the processing tanks 30 to accurately determine the amount of waste material 10 deposited therein. In the preferred embodiment, there are five viewing ports 70 positioned from top to bottom along the front surface 15 so that the volume indicating lines (not shown), denoted as etched or painted thereon, indicate the following total volume amounts: 800 gallons, 650 gallons, 500 gallons, 350 gallons, and 200 gallons.

During operation, an oxidizing agent 85 is used to chemically oxidize the waste material 10 deposited in the processing tanks. Oxidizing agents 85 found useful with the invention include calcium hypochlorite, commonly found in swimming pool cleaning products, which delivers approximately 60% chlorine by weight, and sodium hypochlorite, commonly used in bleach products as a 5–6% aqueous solution. Another type of oxidizing agent 85 found useful with the system 80 is 4% hydrogen peroxide. Other possible oxidizing agents 85 include potassium hypochlorite, sodium dichloro-5-triaznetrione, and sodium dichloro-5 diaznetrione.

In the preferred embodiment, a stock solution of the oxidizing agent 85 is used since solutions are easier to measure and use than dry powders or granules. Although all of the above-mentioned oxidizing agents 85 may be used with the apparatus 14, the particular oxidizing agent 85 used during treatment will depend upon its cost and availability. For example, 5.25% aqueous solution of sodium hypochlorite is often used since it is relatively inexpensive and widely available as a laundry bleach product, such as CLOROX, distributed by The Clorox Company. An aqueous solution of 35% hydrogen peroxide is also widely available and relatively expensive but can be diluted to a suitable percentage. Calcium hypochlorite is widely available from swimming pool product suppliers.

After oxidizing the waste material 10, a flocculating agent 90 is added to flocculate the oxidized waste material. Any conventional flocculating polymer may be used as a flocculating agent to flocculate fine particles in the waste material. Tests have shown that cationic-type flocculating polymers are more effective than anionic or ionic flocculating polymers. One type of cationic-type flocculating polymers shown to be useful is provided by Allied Colloids, Inc. and sold under the name PERCOL 757. Although the flocculating polymers are generally available in solid form, it is more desirable to create a stock 1–2% aqueous solution of it by mixing approximately 8.0 lbs of the flocculating polymer with 200 gallons of water.

To process multiple, small batches of waste material 10 located at various collection sites, shown as a septic tank 100 in FIG. 2., the apparatus 12 is delivered to the collection site. A vacuum truck 101 is also delivered to the septic tank 100 which is used to transfer the waste material 10 from the collection site and to its vacuum tank 102. One end of the outer hose 104 is placed inside the septic tank 100 while the opposite end is connected to the vacuum port located on the vacuum truck 101. Once the waste material 10 is transferred to the vacuum tank 102, all or a portion of the waste material 10 is then transferred to the apparatus 12 using the intermediate hose 106. The waste material 10 is then processed in the manner described in the above cited patent.

After the waste material 10 has undergone separation, the waste water 95 produced is transferred back into the septic tank 100 using a pump 48 and hoses 104 and 106.

When the waste water 95 has been removed from one processing tank 30, the sludge material 99 settles into the hopper section 35. The sludge material 99 may be left in the hopper section 35 or transferred back into the vacuum truck's vacuum tank 102. Typically, 100 to 500 gallons of slurry-like sludge material 99 is produced per 1,000 gallons of waste material 10. Such sludge material 99 has a high water content which enables it to be easily transferred between apparatus 12 and the vacuum tank 102 and, eventually, to the waste water treatment facility.

After the first small batch of waste material has been processed, the apparatus 12 is then transported to a second collection site. There, the apparatus 12 and vacuum truck 101 are set up in the same manner. The waste material 10 is removed from second collection site and deposited inside the vacuum tank 102 where it is mixed with the sludge material 99 produced from waste material collected from the first collection site. After mixing the new waste material with the old sludge material 99, it is then transferred to the apparatus' processing tanks where it is oxidized and flocculated. Because the old sludge material contains some flocculating agent, the time required for flocculating the second batch of waste material may be substantially reduced. The waste water 95 produced is then deposited into the septic tank 100 while the total sludge material 99 is deposited in the vacuum tank 102.

The apparatus 12 and vacuum truck 101 are moved to new collection sites and used to process the waste material 10 therein until the total volume of sludge material 99 either prevents new waste material 10 from being processed or the amount of sludge material 99 exceeds the capacity of the apparatus 12 or vacuum tank 102, or when it is economical to deposit it at the waste water treatment facility.

Once the desired amount of sludge material 99 has been produced, the vacuum truck 101 is then transported to the waste water treatment facility where the sludge material 99 contained therein is deposited.

In summary, the method includes the following steps:

a. depositing a small batch of waste material into an apparatus capable of oxidizing and then separating the waste material into waste water and sludge material;

b. oxidizing and separating said waste material into waste water and sludge material;

c. removing said waste water from said apparatus;

d. depositing a second small batch of waste material in said apparatus;

e. oxidizing and separating said second batch of waste material into waste water and sludge material;

f. removing said waste water produced from said second batch of waste material from said apparatus; and, g. repeating steps (d),(e) and (f) until a desired amount of said sludge material is formed in said apparatus.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A method for processing multiple batches of waste material comprising the following steps:

a. transferring a batch of waste material from a collection site to a vacuum tank on a vacuum truck;

b. transferring said batch of waste material from said vacuum tank to a processing tank of an apparatus capable of oxidizing and separating said waste material into waste water and sludge material;

c. oxidizing and separating said waste material into waste water and sludge material;

d. removing said waste water from said apparatus;

e. transferring said sludge material into said vacuum tank;

f. transferring a second batch of waste material from another collection site to said vacuum tank;

g. transferring said second batch of waste material in said vacuum tank to said processing tank on said apparatus;

h. oxidizing and separating said waste material into waste water and sludge material;

i. removing said waste water produced from said second batch of waste material from said apparatus;

j. transferring said sludge material into said vacuum tank;

k. repeating steps (f)–(j) until a preselected amount of sludge material is formed; and, l. removing said sludge material collected in said vacuum tank.

* * * * *